Feb. 15, 1949.   F. P. HOPFELD   2,461,687
WELDER'S CLAMP
Filed July 19, 1946
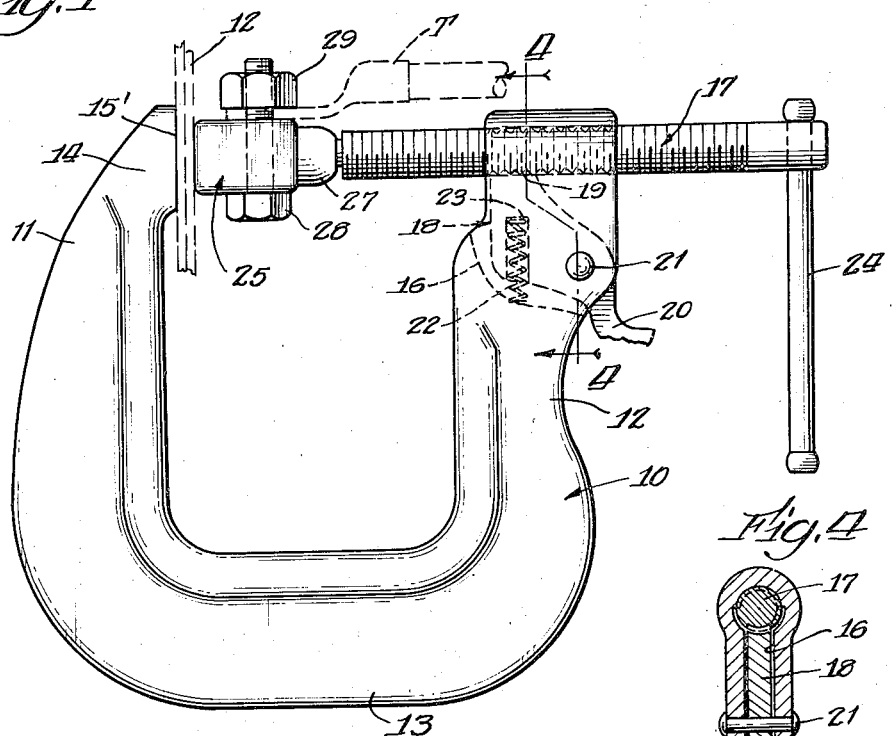
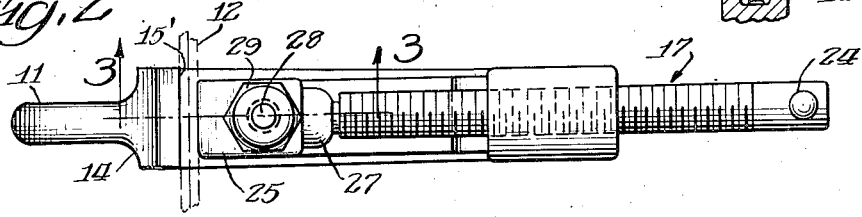
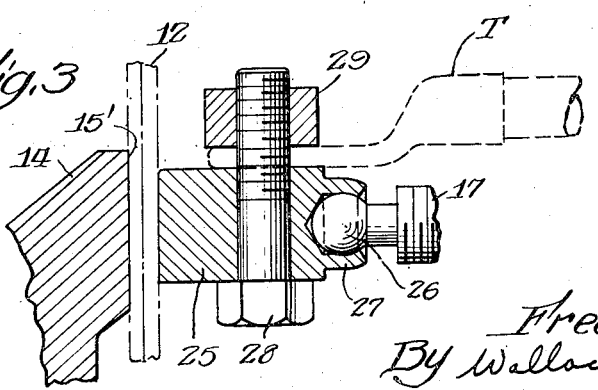
Inventor
Fred P. Hopfeld
By Wallace and Cannon
attorneys Patented Feb. 15, 1949

2,461,687

UNITED STATES PATENT OFFICE 2,461,687

WELDER'S CLAMP

Fred P. Hopfeld, Elmwood Park, Ill., assignor to Grand Specialties Company, Chicago, Ill., a corporation of Illinois Application July 19, 1946, Serial No. 684,974

1 Claim. (Cl. 173—273)

This invention relates to clamps and more particularly to clamps of the type especially adapted to hold work which is being welded during an electric arc welding operation.

In electric arc welding it is necessary that a closed circuit be established from a power source through the welding rod, the work upon which the welding operation is being performed, and back to the power source. For this purpose the welding rod is usually connected to the power source by a cable and another cable connects the other side of the power source to the work. It is a primary object of my invention to construct a clamp which is adapted to retain work during an electric arc welding operation and which provides a readily accessible connecting member to which the terminal of the cable, by which the work is connected to the power source, may be connected.

It is another object of my invention, ancilliary to the foregoing, to construct a welding clamp in such a manner that the terminal which is provided for connection to the work connecting cable of the welding apparatus may be so positioned by the operator that it does not interfere with the welding operation.

It is a further object of my invention to associate the elements of a welding clamp in such a manner that the feed screw thereof may be readily adjusted.

Other and further objects of the present invention will be apparent from the following description and claims and are illustrated in the accompanying drawing which, by way of illustration, shows a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claim.

In the drawings:

Fig. 1 is a side elevational view of a welding clamp, illustrating my invention as it would appear holding a piece of work and connected to a terminal of an electric arc welding apparatus;

Fig. 2 is a top elevational view of the clamp shown in Fig. 1;

Fig. 3 is a detail view, partly in section, taken substantially along the line 3—3 in Fig. 2; and Fig. 4 is a detail sectional view taken substantially along the line 4—4 in Fig. 1.

The clamp shown in the accompanying drawing embodies a substantially U-shaped body member 10 comprising two legs 11 and 12 connected together by a transverse portion 13. The free end portion of the leg 11 forms a jaw 14 having a substantially flat face 15' against which the work to be welded is pressed during a welding operation as will hereinafter be more fully described.

The leg 12 of the body 10 has an elongated slot 16 extending therethrough (Fig. 4). A bolt or feed screw 17 extends through the upper end portion of the slot 16, the upper end portion of the slot 16 being substantially complementary in shape, but slightly larger than the feed screw 17 so that the feed screw 17 may be moved in a longitudinal direction therethrough.

A lever 18 having a serrated edge 19 and a thumb piece 20 is pivotally mounted within the lower end portion of the slot 16 by any suitable means such as a pin 21. The teeth or threads forming the serrations on the serrated edge 19 of the lever 18 are complementary to the threads formed on the feed screw 17. A spring 22 is mounted in a cavity 23 formed in the lower portion of the lever 18 and presses against the lower surface of the slot 16 to urge the lever 18 to pivot around the pin 21 and maintain the threads formed in the serrated edge portion 19 of the lever 18 in engagement with the threads formed on the feed screw 17. A handle 24 is attached to the outer end portion of the feed screw 17 so that the feed screw 17 may be readily turned either in a clockwise direction or in a counterclockwise direction (as viewed in Fig. 4) to thereby feed the screw 17 inwardly toward the jaw 14 or withdraw it therefrom, respectively.

A block 25 is mounted on the inner end portion of the feed screw 17 by a ball and socket connection, the ball 26 being formed on the inner end portion of the feed screw 17 and the socket 27 being formed in the block 25. A bolt or terminal post extends through the block 25, and the terminal T of an electric arc welding apparatus may be secured thereto by means of a nut 29. The block 25, because of its ball and socket connection with the feed screw 17 may be rotated with respect to the longitudinal axis of the feed screw 17 and therefore it will be noted that the terminal T may be placed in any desired position there around.

When my clamp is used during a welding operation, the work W is first placed in the desired position against the face 15' of the jaw 14. The thumb piece 20 may then be raised causing the lever 18 to rotate in a counter-clockwise direction (as viewed in Fig. 1) so that the serrated edge 19 thereof is lowered out of engagement with the feed screw 17 and the feed screw 17 may then be slid inwardly to such a position that the end of the block 25 engages the other side of the work W. The thumb piece 20 is then released permitting the spring 2 to pivot the lever 18 in the other direction thus causing the serrated edge 19 thereof to again engage the threads on the feed screw 17, and the feed screw 17 may then be advanced further into final position, where-at it presses tightly against the work W, by turning it in a clockwise direction. It will be noted in this connection that during the final adjustment of the feed screw 17, the wedging action of the threads thereon with respect to the threads formed on the serrated edge portion 19 of the lever 18 causes the lever 18 to tend to rotate in a clockwise direction (as viewed in Fig. 1), thus wedging the teeth on the serrated edge 19 and the teeth on the feed screw 17 into such tight connection that pressure applied to the thumb piece 20 at this time is ineffective to cause release of the serrated edge 19 from the feed screw 17. In order for release of the feed screw 17 from the serrated edge of the lever 18 to be effected the feed screw 17 must first be backed off so that the wedging action between it and the lever 18 is relieved. Therefore, it will be seen that during the final adjustment of my clamp, the turning of the feed screw 17 so that the block 25 is advanced inwardly provides a tight non-slip connection for the feed screw so that the work W is firmly held between the jaw 14 and block 25.

It will be noted that, because of the pivotal mounting of the lever 18, the initial or rough adjustment of the feed screw 17 may be made by merely pressing inwardly thereon and thereby causing it to slip over the teeth on the serrated edge 19 of the lever 18. However, because of the wear which would be caused to the threads on the feed screw 17 and the teeth of the lever 18, this is not desirable as a general practice, and preferably, during the initial adjustment of the feed screw 17, the lever 18 is disengaged therefrom by pressing upwardly on the thumb piece 20 as hereinbefore described.

From the foregoing it will be noted that good electrical connections between the work W and the power source of the electric arc welding apparatus is provided through the terminal T and the block 25. Thus when the welding rod (not shown) is applied to the work W in the normal manner, a good welding circuit is completed through the work W.

Also it will be noted that with my novel clamp the terminal T may be turned into any desired position around the longitudinal axis of the screw 17 so that it may be readily adjusted by the welder to such a position that it does not interfere with the welding operation.

Also it will be noted that provisions may be made for the passage of high or low amperage through the work W without burning the work W at the point where the block 25 is connected thereto by varying the size of the block 25 used. Thus when high amperages are necessary in a welding operation a larger block 25 would be used, and when lower amperages are all that are necessary, a smaller block 25 may be used.

When the welding operation has been performed on a piece of work W and it is desired to exchange the piece of work for another one, the feed screw 17 may be turned so as to back the block 25 away from the work and the completed piece of work may then be removed and a new piece of work which it is desired to weld may be placed between the anvil 14 and the block 25 and the feed screw 17 again turned so that the block 25 presses tightly against the new piece of work. During the changing of the pieces of work as just described, it will be noted that the terminal T has remained connected to the block 25 so that it is unnecessary to go through a separate connecting operation with respect to the newly positioned piece of work W, the very act of mounting the piece of work W within the clamp having established this connection.

From the foregoing it will be apparent that I have provided a novel clamp which is especially well adapted for holding a piece of work while engaged in an electrical arc welding operation thereon and whereby pieces of work may be quickly and easily mounted for the electrical welding operation.

Also it will be noted that my clamp is sturdily constructed and provides both a rough and fine adjustment of the feed screw so that when it is necessary to move the feed screw 17 through a relatively great distance this may be easily accomplished by releasing the serrated lever therefrom and manually and freely sliding the feed screw 17 into the desired position and also when it is desired to make the final fine adjustment of the screw 17 this may be performed by turning the feed screw and advancing the threads thereon over the threads in the serrated edge portion of the lever.

Hence, while I have illustrated and described the preferred embodiment of my invention, it is to be understood that this is capable of variation and modification and I therefore do not wish to be limited to the precise details set forth, but desire to avail myself of such changes and alterations as fall within the purview of the following claim.

I claim:

A welder's clamp for operatively holding and grounding a work piece during an electric welding operation comprising a substantially U-shaped body member including spaced substantially parallel legs and an interconnecting transverse portion, one leg constituting a fixed jaw for engaging the work piece, the opposite leg having a feed screw receiving aperture extending therethrough in alignment with and perpendicular to the fixed jaw, said leg having a substantially rectangular slot depending from said aperture and in communication therewith and extending inwardly of the leg, the wall of the aperture having substantially semicircular screw threads throughout its length on a portion thereof and the remaining portion of the aperture walls being smooth and a portion thereof being open and communicating with the slot, a threaded feed screw received within the aperture, said screw being of less diameter than said aperture, an operating handle on the outer end of said feed screw for rotating the same and for moving the screw toward and away from the fixed jaw, a latch member pivotally mounted within the slot and including an operating extension projecting outwardly of the slot exteriorly of the said leg and toward the operating handle, the other end of said latch member having serrations thereon in the nature of threads for engagement with the threads on the said feed screw, a bore within said latch member in alignment with the said leg, a spring received within the bore and having its outer end bearing against the base of the wall of the said slot for normally forcing said serrated portions of said latch member into engagement with the threads of the feed screw, so that when the latch member is pivoted upon actuation of the operating extension thereon, the serrations on the latch member are disengaged from the threads on the feed screw and rapid non-rotative longitudinal movement of the feed screw toward and away from the fixed jaw may be obtained, and when the serrations on the latch member are in engagement with the threads of the feed screw the same may be rotatably fed and retracted toward and away from the fixed jaw by means of the operating handle, a ball member carried by the inner end of said feed screw, a combined work piece clamping and electrical connecting block having a flat work piece engaging surface at one end and a ball receiving extension socket at the other end, the ball carried by the inner end of the feed screw being rotatably secured in the extension socket, said block also having an aperture extending therethrough from side to side transversely of the longitudinal axis of the feed screw, a terminal bolt disposed within said aperture and extending outwardly thereof to which a ground conductor may be connected, the ball and socket connection being such that universal 360 degree rotation of said combined clamping and electrical connection block about the axis of said feed screw for the adjustment of the position of the ground conductor with respect to the work piece disposed between the fixed jaw and the clamping and electrical connection block may be obtained.

FRED P. HOPFELD.

REFERENCES CITED

The following references are of record in the file of this patent:

UNITED STATES PATENTS

| Number | Name | Date |
| --- | --- | --- |
| 71,983 | Coe et al. | Dec. 10, 1867 |
| 809,882 | Wrigley | Jan. 9, 1906 |
| 2,086,784 | Taylor | July 13, 1937 |
| 2,120,447 | Tipsord | June 19, 1938 |
| 2,420,895 | Merriman | May 20, 1947 |